Patented July 9, 1935

2,007,335

UNITED STATES PATENT OFFICE 2,007,335

PROCESS OF PRODUCING O-AMINO-ARYL MERCAPTANS AND DERIVATIVES THEREOF

Herbert A. Lubs, John E. Cole, and Arthur L. Fox, Wilmington, Del., assignors to E. I. du Pont de Nemours & Company, Wilmington, Del., a corporation of Delaware No Drawing. Application September 17, 1930, Serial No. 482,644

14 Claims. (Cl. 260—130.5)

This invention relates to the hydrolysis of aryl-thiazoles and in general to o-amino-aryl mercaptans. The prior art shows that several types of aryl thiazoles have been hydrolyzed by highly concentrated caustic potash or by alcoholic potash. In 1880 A. W. Hofmann (Ber. 13, 1227) heated

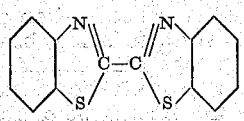

with solid potassium hydroxide to 200° and obtained o-amino thio phenol. In Ber. 13, 18–20 the same year he heated the following benzothiazoles

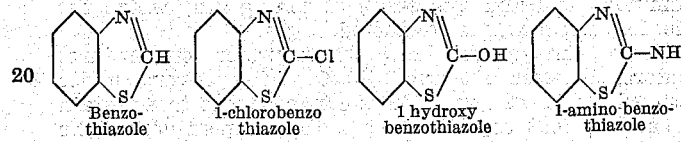

Benzo-thiazole   1-chlorobenzo thiazole   1 hydroxy benzothiazole   1-amino benzo-thiazole with fused caustic and obtained the same amino thiophenol. In 1887 Hofmann (Ber. 20, 1790) heated mercapto benzothiazole

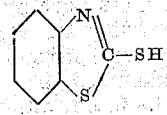

with fused caustic and obtained o-amino thiophenol. That this reaction is specific to the thiazole ring and not to the aryl group is suggested by Hofmann (Ber. 20, 1802) when he fused

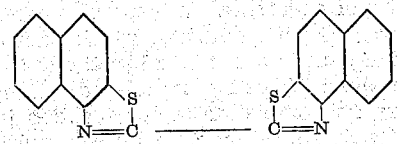

with solid potassium hydroxide and obtained the α-amino-β-thionaphthol. From the reverse compound he obtained in the same way β-amino-α-thionaphthol.

Jacobson & Frankenbacher (Ber. 24, 1404) heated mercapto benzothiazole in a sealed tube to 190-200° with alcoholic potassium hydroxide and obtained o-amino thiophenols, and they (Ber. 24, 1407) also heated mercapto naphthyl thiazole with alcoholic potassium hydroxide to 180–200° and obtained the o-amino thionaphthol. They heated 1-phenyl amino-benzothiazole

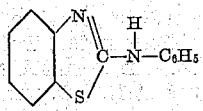

with alcoholic potash to 200° and got o-amino thiophenol. Jacobson fused 1-methyl benzothiazole

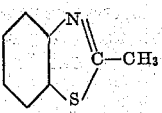

with potassium hydroxide and obtained o-amino thiophenol. There are many other references available that show that this is a well known reaction.

The process, when conducted with fused or alcoholic caustic potash, is uneconomical because of the large quantities of caustic potash which must be used. Caustic soda has been tried but is unsatisfactory because, while to a limited degree the hydrolysis takes place, there is such excessive foaming that the hydrolysis is commercially impracticable. Moreover, both the caustic potash and caustic soda hydrolysis require such high concentration of alkali—from 50 to 70%—that decomposition is prevalent with the resultant formation of undesirable by-products and decrease of yield. The reaction requires considerable time, between from four to seven hours being the minimum time necessary.

Our invention has for an object the hydrolysis of aryl thiazoles to form amino-aryl mercaptans by a process which is relatively inexpensive, easily controlled, and remarkably efficient. Another object is the elimination of foam, the undesirable decomposition of the thiazole, and elimination of a large amount of the time heretofore necessary. Further objects will be apparent as our description proceeds.

These objects are accomplished by our process which, in its simplest aspect, comprises the hydrolysis of aryl thiazoles by means of dilute caustic alkali, and preferably caustic soda solutions under elevated pressures. The reaction may be illustrated as follows:

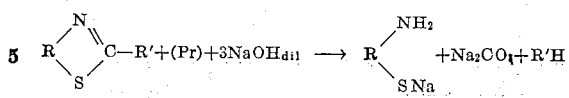

in which Pr illustrates super-atmospheric pressure; R is an aryl nucleus which may be substituted or unsubstituted, and R' may be hydrogen, halogen, alkyl, aryl, hydroxy, alkoxy, aryloxy, amino, alkyl- or dialkyl-amino, aryl- or diarylamino, mercapto, alkyl- or arylmercapto.

By way of further illustration of our invention are the following examples:

Example 1

230 pounds of 1-amino-5-ethoxy-benzothiazole

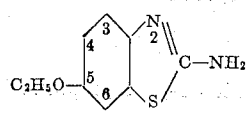

were stirred up with 2000 pounds of water and 230 pounds of sodium hydroxide. This mixture was heated with stirring in a suitable closed vessel for about two hours at 160° C. and under a pressure of 80 pounds per square inch. After cooling the 2-amino-5-ethoxy-thiophenol, which was formed by the reaction, was isolated as the zinc salt or as the hydrochloride. The thiophenol was also isolated in an alternative manner by the addition of chloroacetic acid to produce the corresponding thioglycollic acid from the o-amino phenol.

Example 2

200 grams of 1-amino-5-ethoxy benzothiazole hydro-halide (which is a mixture of the bromine and chlorine salts of the benzothiazole made, for example, by the process described in U. S. application 456,289 filed by two of the joint inventors, Herbert A. Lubs and Arthur L. Fox) were stirred up with 1,000 cc. of 20% caustic soda solution and heated in a closed vessel with stirring for two hours at a temperature of 120° C. The pressure developed was 25 pounds. After cooling the 2-amino-5-ethoxy thiophenol which had been formed was isolated as the aryl thioglycollic acid.

Example 3

200 grams of 1-amino-5-ethoxy benzothiazole hydro-halide were stirred up with 1,000 cc. 20% caustic soda solution and heated in a closed vessel with stirring for one-half hour at 160° C. The pressure developed was 80 pounds at this temperature. After cooling the 2-amino-5-ethoxy-thiophenol formed was isolated as the aryl thioglycollic acid.

Example 4

Example 3 shows that the hydrolysis satisfactorily takes places within as small amount of time as one-half hour. Conversely, the heating may be continued for a long period of time, such as for twenty-four hours, without bad effects. Thus, 200 grams of 1-amino-5-ethoxy-benzothiazole hydrohalide were stirred up with 1,000 cc. of 20% caustic soda solution and heated in a closed vessel under a pressure of 70 pounds per square inch at a temperature of 160° C. for a period of twenty-four hours. After cooling the 2-amino-5-ethoxy-thiophenol formed was isolated as the aryl thioglycollic acid.

Example 5

300 grams of 1-amino-5-ethoxy-benzothiazole hydrohalide were heated with stirring with 1,000 cc. of 30% by volume caustic soda solution for two hours at 160° in a closed vessel. The pressure developed was 70 pounds. After cooling the 2-amino-5-ethoxy-thiophenol formed was isolated as the aryl thioglycollic acid.

Example 6

50 grams of 1-amino-5-ethoxy-benzothiazole hydrohalide were heated with stirring with 1,000 cc. of 5% caustic soda solution for two hours at 160° C. and under a pressure of 70 pounds per square inch. After cooling the 2-amino-5-ethoxy-thiophenol formed was isolated as the aryl thioglycollic acid.

Example 7

250 grams of 1-amino-3-methyl benzothiazole were heated for four hours with 1,000 cc. 25% by volume caustic soda at 190° C. The pressure developed was 125 pounds. After cooling the 2-amino-3-methyl-thiophenol formed was isolated as the aryl thioglycollic acid.

It is to be understood that numerous modifications both as to the nature of the reactants and condition of reaction may be made without departing from the spirit of our invention illustrated by the above examples. For example, we have found that the concentration of caustic alkali, such as the caustic soda, may be varied within wide limits, but that care should be taken to avoid too high a concentration which results in decomposition. In general, we prefer concentrations between 5 and 30%. We have found that the temperatures under which this hydrolysis is conducted may vary widely, depending upon the thiazole derivative employed as a starting material and the length of time during which the hydrolysis is conducted.

In general, however, we prefer temperatures between 100 and 300° C. The pressure under which the reaction is carried out is to a certain extent dependent upon the temperature of the reaction. Our preferred range of pressures, however, lies between five pounds per square inch (above atmospheric pressure) and 250 pounds per square inch. While our description has been illustrated for the most part by benzothiazoles, it is to be understood that any aryl thiazole, such as the naphthothiazoles, both substituted and unsubstituted, may be employed.

Our process results in obvious economies since, although we preferably use caustic soda, there is no foaming and resultant loss therefrom. The relative cheapness of caustic soda as compared to caustic potash and the fact that we employed smaller amounts of caustic result in marked economies of operation. In general, we conduct the hydrolysis with solutions which contain an amount of caustic alkali equal to the amount of thiazole which is being hydrolyzed. The time necessary for completion of the reaction is very materially shortened by our process, resulting in a saving of not only time, itself, but labor and fuel. In general, our process results in products which are of unusual purity and which are obtained in yields varying between 80 and 95% of the theoretical depending, to a certain extent, upon the conditions of operation.

Since many embodiments of this invention, differing widely in one or more respects, may be made without departing from the spirit of our invention, it is to be understood that we do not limit ourselves to the foregoing examples or description except as indicated in the following claims:

We claim:

1. A process of producing o-amino-aryl mercaptans which comprises reacting an aryl amino thiazole with an aqueous solution of sodium hydroxide containing at least three mols of sodium hydroxide per mol of arylamino-thiazole and having a concentration below about 30% sodium hydroxide under superatmospheric pressure at a temperature above about 100° C. and below the decomposition temperature of the o-amino-aryl mercaptan.

2. A process of preparing an o-amino-aryl-mercaptan of the benzene series which comprises reacting an amino-benzo-thiazole with an aqueous solution of an alkali metal hydroxide under superatmospheric pressure at a temperature above about 100° C. and below the decomposition temperature of the o-amino-aryl-mercaptan, said aqueous solution having an alkali concentration below about 30% and containing at least three mols of alkali metal hydroxide per mol of aminobenzothiazole body.

3. A process of preparing an o-amino-aryl-mercaptan of the benzene series which comprises reacting an amino-benzo-thiazole with a 5 to 30% aqueous sodium hydroxide solution containing at least three mols of sodium hydroxide per mol of aminobenzothiazole at a temperature within the range above about 100° C. but below the decomposition temperature of the o-amino-aryl-mercaptan and under a superatmospheric pressure.

4. The process of preparing 2-amino-5-ethoxy thiophenol which comprises heating 1-amino-5-ethoxy-benzothiazole hydrohalide with an aqueous caustic alkali solution under autogenous super-atmospheric pressure at a temperature of about 160° C., the amount of caustic alkali corresponding to at least three mols per mol of 1-amino-5-ethoxy-benzothiazole-hydrohalide and the concentration of the caustic alkali solution being less than about 30% caustic alkali.

5. A process of preparing 2-amino-5-ethoxy-thiophenol which comprises reacting 1-amino-5-ethoxy-benzothiazole hydrohalide with a caustic soda solution having a concentration below about 30% and containing at least three mols of caustic soda per mol of 1-amino-5-ethoxy-benzothiazole-hydrohalide under super-atmospheric pressure at a temperature above about 100° C. and below the decomposition temperature of the 2-amino-5-ethoxy-thiophenol.

6. A process of preparing 2-amino-3-methyl-thiophenol which comprises reacting 1-amino-3-methyl-benzothiazole with a caustic soda solution having a concentration below about 30% and containing at least three mols of caustic soda per mol of 1-amino-3-methyl benzothiazole under super-atmospheric pressure at a temperature above about 100° C. and below the decomposition temperature of the 2-amino-3-methyl-thiophenol.

7. A process of preparing 2-amino-5-ethoxy-thiophenol which comprises reacting 1-amino-5-ethoxy-benzothiazole hydrohalide with a caustic soda solution having a concentration of about 5% to about 30% and containing at least 3 mols of caustic soda per mol of 1-amino-5-ethoxy-benzothiazole-hydrohalide under super-atmospheric pressure at a temperature of about 160° C.

8. In a process of producing ortho-amino-aryl-mercaptans, the step which comprises hydrolyzing an aryl-thiazole with an alkali metal hydroxide solution containing water and an amount of alkali metal hydroxide at least equal to the amount theoretically required to break the thiazole ring and form an alkali metal salt of the mercaptan, while in the course of the reaction having the concentration of the caustic alkali solution below about 30% caustic alkali and at the same time operating under super-atmospheric pressure at temperatures above about 100° C. but below temperatures giving rise to the formation of substantial amounts of decomposition products.

9. In a process of producing ortho-amino-aryl-mercaptans, the step which comprises hydrolyzing an aryl-thiazole with a sodium hydroxide solution containing an amount of sodium hydroxide at least equal to the amount theoretically required to break the thiazole ring and form an alkali metal salt of the mercaptan and an amount of water such that the concentration of the sodium hydroxide solution in the course of the reaction is below about 30% sodium hydroxide, while maintaining super-atmospheric pressure in the reaction zone and carrying out the reaction at a temperature about above 100° C. but below temperatures giving rise to the formation of substantial amounts of decomposition products.

10. In a process of producing ortho-amino-aryl-mercaptans, the step which comprises hydrolyzing an aryl-amino-thiazole with a water-containing solution of an alkali metal hydroxide having a concentration below about 30% and containing at least three mols of alkali metal hydroxide per mol of aryl-amino-thiazole under super-atmospheric pressure at a temperature above 100° C. but below temperatures giving rise to the formation of substantial amounts of decomposition products.

11. A process of producing ortho-amino-aryl-mercaptans which comprises heating an aryl-amino-thiazole with a water-containing caustic soda solution of from 5 to 30% concentration containing at least three mols of caustic soda per mol of aryl-amino-thiazole under a super-atmospheric pressure below 250 pounds per square inch at a temperature above 100° C. but below temperatures giving rise to the formation of substantial amounts of decomposition products.

12. In a process of producing ortho-amino-aryl-mercaptans, the step which comprises hydrolyzing an arylamino-thiazole with an alkali metal hydroxide solution containing an amount of alkali metal hydroxide approximately equal on a weight basis to the amount of thiazole body and an amount of water such that the concentration of the alkali metal hydroxide solution in the course of the reaction is below about 30% alkali metal hydroxide, while maintaining super-atmospheric pressure in the reaction zone and carrying out the reaction at a temperature above about 100° C. but below temperatures giving rise to the formation of substantial amounts of decomposition products.

13. In a process of producing ortho-amino-alkyl substituted phenyl mercaptans, the step which comprises hydrolyzing an aminobenzothiazole containing an alkyl substituent in its benzene nucleus with an alkali metal hydroxide solution containing at least three mols of alkali metal hydroxide per mol of thiazole body and an amount of water such that the concentration of the alkali metal hydroxide solution in the course of the reaction is below about 30% alkali metal hydroxide, while maintaining super-atmospheric pressure in the reaction zone and carrying out the reaction at a temperature of about 190° C.

14. In a process of producing ortho-amino-alkoxy substituted phenyl mercaptans, the step which comprises hydrolyzing an aminobenzothiazole containing an alkoxy substituent in its benzene nucleus with an alkali metal hydroxide solution containing at least three mols of alkali metal hydroxide per mol of thiazole body and an amount of water such that the concentration of the alkali metal hydroxide solution in the course of the reaction is below about 30% alkali metal hydroxide, while maintaining super-atmospheric pressure in the reaction zone and carrying out the reaction at a temperature of about 160° C.

HERBERT A. LUBS.
JOHN E. COLE.
ARTHUR L. FOX.